J. H. COTTON AND W. L. BURNER.
TRUCK COUPLING.
APPLICATION FILED AUG. 23, 1919.
1,423,084.
Patented July 18, 1922.
2 SHEETS—SHEET 1.
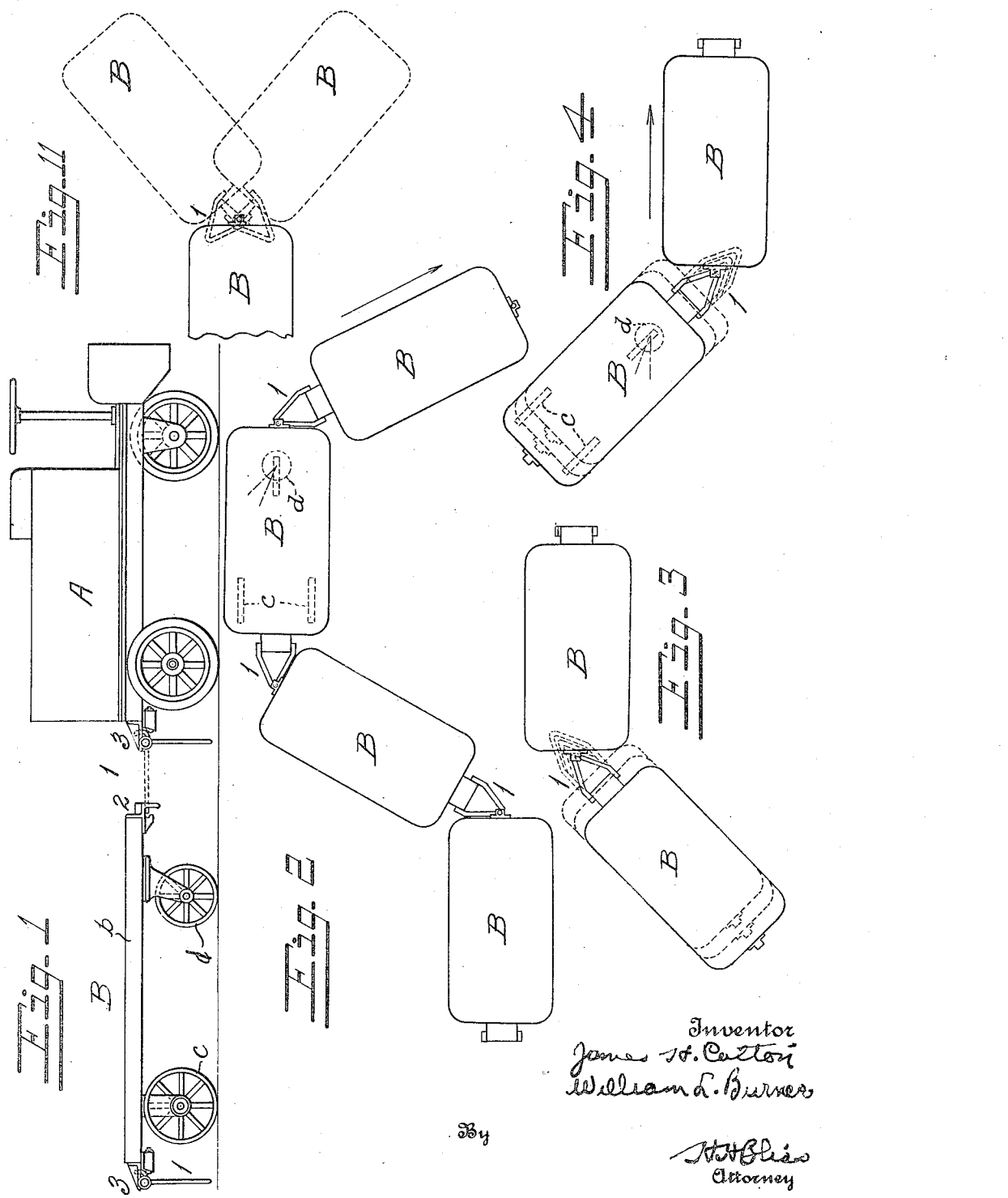

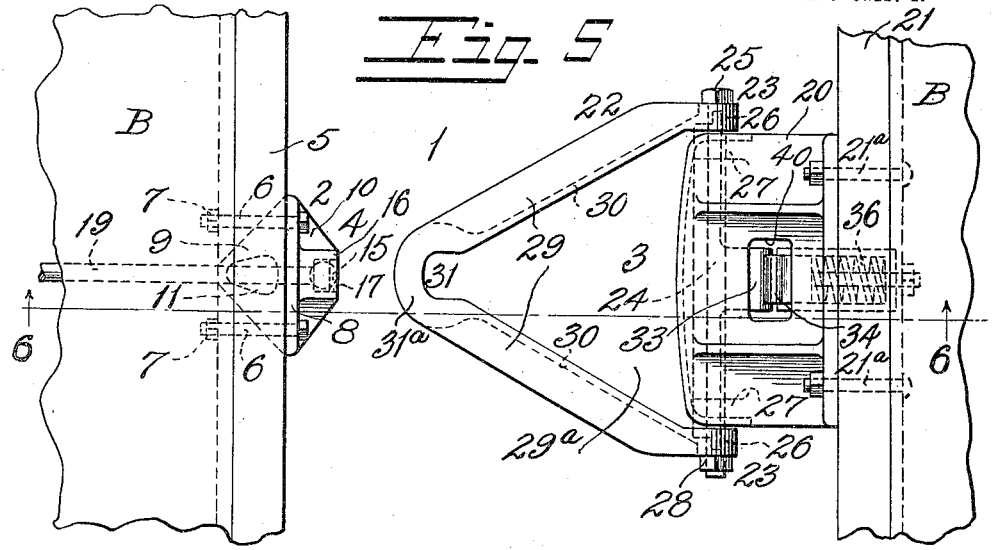
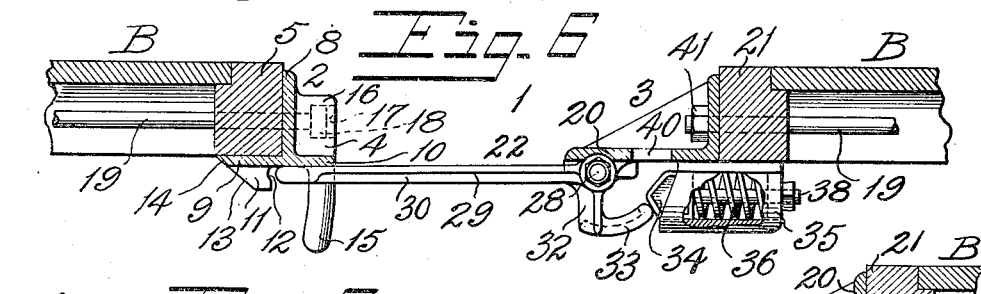
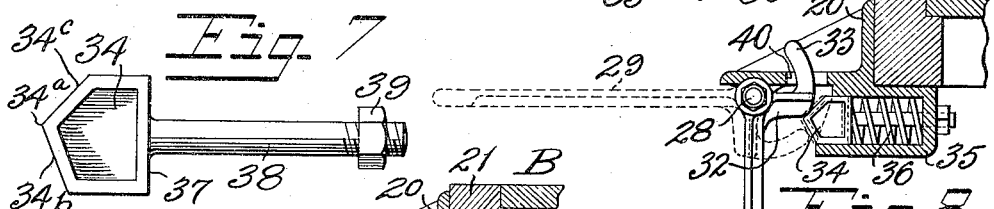
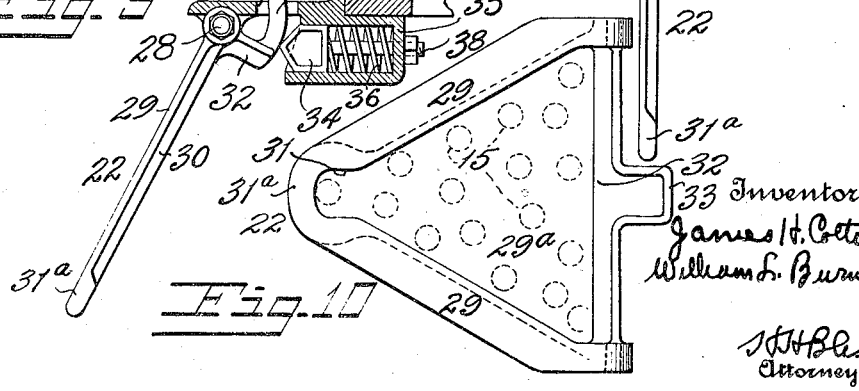

UNITED STATES PATENT OFFICE.

JAMES H. COTTON AND WILLIAM L. BURNER, OF COLUMBUS, OHIO, ASSIGNORS TO THE KILBOURNE & JACOBS MANUFACTURING COMPANY, OF COLUMBUS, OHIO, A CORPORATION OF OHIO.

TRUCK COUPLING.

1,423,084.   Specification of Letters Patent.   Patented July 18, 1922.

Application filed August 23, 1919. Serial No. 319,489.

*To all whom it may concern:*

Be it known that we, JAMES H. COTTON and WILLIAM L. BURNER, citizens of the United States, residing at Columbus, in the county of Franklin and State of Ohio, have invented certain new and useful Improvements in Truck Couplings, of which the following is a specification, reference being had therein to the accompanying drawing.

This invention relates to improvements in coupling devices for joining trackless vehicles either to a tractor or locomotive, or to each other; particularly, improvements in the small truck-like vehicles now largely used, either single or in trains, around railroad stations, for transporting baggage, mail-bags, etc., and also used in warehouses, and similar places.

These are generally drawn by small tractors, or self-propelling motor-driven cars. The load-carrying trucks (when in use in places such as aforesaid) are liable to be standing in irregular relationship—that is, each may be in any of several positions relative to the line of travel which they are to follow when put in motion. Heretofore, difficulty has been experienced in quickly and readily coupling up in a train series a number of such trucks when they are standing thus irregularly in relation to the line of travel. They have been so made that, preliminary to the final coupling of one to another, it has been necessary to first bring each of them, while still uncoupled, into approximate alignment with its neighbor, in order to permit the companion coupling devices to be positioned in operative relationship; or else to provide exceedingly long links or coupling-bars.

One object of the present invention is to provide coupling devices such that any two adjacent trucks can be joined, when positioned at any angle of a wide range of angles, and avoid the necessity of having them preliminarily aligned. Another object is to provide coupling devices which are strong and durable, although simple in construction and relationship, and which can be attached to trucks of many of the ordinary sorts.

Fig. 1 is a side elevation of two vehicles equipped with a coupling device embodying our improvements.

Fig. 2 is a plan view of a train of vehicles joined together by our improved coupling device.

Figs. 3 and 4 are plan views showing some of the relative positions two adjacent vehicles may occupy at the time of coupling.

Fig. 5 is a plan view of our device showing some of the details.

Fig. 6 is a vertical section taken on the line 6—6 of Fig. 5 showing some of the parts in side elevation.

Fig. 7 is an enlarged view of one of the parts of the coupler.

Figs. 8 and 9 show the movable element of the coupler in different positions.

Fig. 10 is a plan view of the coupler loop detached.

Fig. 11 is a diagram illustrating relative positions of trucks when being coupled.

In the drawings, A is a self-propelling truck or car of any of the ordinary sorts used in and around railroad stations and warehouses. B is a trailer designed for use with such a truck. It has the platform-body $b$, the wheels $c$, $c$, and the caster-wheel $d$ which permits swinging motion of the front axle of the trailer. The tractor and trailer are joined together by means of the coupling devices 1, made up of the two parts 2 and 3.

The part 2, or male element of the coupler, consists of the casting 4 secured to the central part of the front end of the vehicle by the bolts 6, 6 and the nuts 7, 7 which fasten the casting to the frame-bar 5.

This casting has a vertical flange 8 which is adapted to lie flat against the front vertical face of the cross-piece 5, a horizontal rearwardly-extending flange 9 which fits snugly up against the bottom face of the cross-piece, and a horizontal forwardly extending, forwardly-tapering plate 10 which lies in the same plane as the flange 9.

The flange 9 carries a centrally-located, downwardly-extending lug 11 which has a transverse semi-circular recess 12 in its front face immediately below the flange 9. The rear face 13 of the lug 11 slopes upward and backward to the point of juncture with the flange 9, and the rear edge of said flange is beveled off at 14 in the same plane as the surface 13, so that a continuous smooth face is obtained from the bottom of the vehicle frame to the lower face of the lug 11, for a purpose to be hereinafter described.

The plate 10 carries near its apex a downwardly-extending pin or lug 15 which is circular in cross-section, and which is bent slightly backward at its lower end. A web 16 strengthens the plate-part 10 of the casting. In this web 16 there is a recess 17 square in cross-section which is adapted to hold the square-shaped head 18 of the strengthening rod 19 and to keep said head and rod from turning axially.

The part 3, or female element of the coupler, comprises a cast plate 20 secured to the middle of the cross-bar 21 of the vehicle B by means of the bolts 21ª, 21ª and a triangular-shaped yoke or link 22. The yoke 22 is hinged horizontally to the cast plate 20 at 23, 23 by the hinge-pin 24, having the head 25 and shank passing through the eyes 26, 26 cast integrally with the yoke, and the eyes 27, 27 cast integrally with the plate 20. The nut 28 secures the pin 24 in its proper position. The distance between the inner faces of the eyes 26, 26 is slightly greater than that between the outer faces of the eyes 27, 27, to avoid frictional binding between the adjacent face of one eye and the face of its neighbor, and to permit a free swinging movement of the yoke 22.

The converging sides 29, 29 of the yoke 22 are formed with downwardly-projecting flanges 30, 30 on their inner sides which act as strengthening webs and which also present a broad wearing surface to the pin 15. At their forward ends they terminate in a small loop 31ª having a recess or socket 31 which, in operation, receives the holder pin 15.

The transverse part 32 of the yoke 22, which lies in the same plane with, but below, the hinge-pin 24, is provided with an arcuate lug 33 which is adapted to bear against the plunger 34. This plunger is mounted in a casing 35, secured to or cast with the bottom of the casting 20, and it tends to be forced outward by means of the compression spring 36. This spring 36 bears against the face 37 of the lug on the outer end of the plunger 34 and against the inner rear wall of the casing 35. The shank 38 of the plunger 34 is threaded at the end, and, by means of the nut 39, adjustment of the extreme forward position of the plunger can be made.

A rectangular-shaped aperture 40 in the horizontal part of the casting 20 permits the lug 33 to travel in its upward arcuate path without hindrance, as shown in Figs. 8 and 9, when the yoke 22 is lowered from its horizontal position.

The forward converging side bars 29 and the front surface of the base casting 20 enclose a wide triangular space, and the parts are so co-related that the coupling loop 22 and the holder pin 15 can be positioned to have the pin in any one of a large number of positions in this triangular space, as shown by dotted circles in Fig. 10.

When two vehicles are to be coupled either can be caused to approach the other on any of numerous lines and can be in either of several positions along one line as is shown in Figs. 3 and 4. Neither the tractor nor any of the vehicles is guided or held in predetermined longitudinal lines, at the time of coupling, relative to any of the others. As noted, either of two adjoining vehicles can be positioned at any of numerous inclinations to the other and yet be in position where it can be accurately and quickly coupled.

And they can be similarly joined at either of several distances apart. But the coupling, in its entirety, is relatively short in contrast with the long bar couples that have been heretofore used in joining vehicles of this class; for the base element 20 has no forward projecting part similar to the bumpers or buffers always used on track guided cars. And as the converging bars 29, 29, are spaced relatively widely apart the large open space or area 29ª, above mentioned, is provided, expanded over long transverse lines. Consequently, any vehicle B can approach its neighbor, in the way described, that is, on either of numerous lines, and yet be in a position to have the coupler loop 22 swing up and assuredly surround the holder pin 15.

When the two vehicles are in coupling position the operator swings the yoke 22 outward and upward from its pendent position. After it swings far enough to bring the end of the curved lug 33 below the extreme forward point 34ª of the spring pressed plunger 34 the lower inclined surface 34ᵇ of the plunger engages with said end of lug 33 and the spring 36 causes the loop to swing through the last part of its movement up to its horizontal position and holds it there with all necessary force, though it holds yieldingly so that the loop can swing vertically up or down to a sufficient extent to allow the relative movements, vertically, of the vehicle.

At the time of coupling one vehicle to the next if the holder pin 15, after entering the space 29ª, is in a position where it will impinge on, or be impinged upon by, either of the converging bars 29 at a point remote from the socket recess 31, as soon as draft is exerted by the pulling vehicle the tendency is to move the end part of one of the adjacent vehicles laterally under the pressure from the pin 15 on the contacting bar 29, this lateral or swinging movement continuing until the holder pin 15 reaches and is held in socket 31. As shown, the swinging caster wheel $d$ is under that end of the vehicle which carries the holder pin 15, and, therefore, that end of that vehicle is the one which will move laterally until it comes into the draft line.

Should the loop $31^a$ at the ends of the bars 29 swing up vertically, to a position well under the rear of the adjacent vehicle, that is, swing up on lines considerably inside of the holder pin 15, it will either strike against the bottom of the lug 11, or against the rear sloping edge 13 of the lug, or will be so far under the vehicle that the bars 29 will strike the under surface of the end parts of the plate 10, or the cross bar 5. In any such case the parts will finally reach the positions shown in Fig. 6 after the vehicle, which exerts the draft, has commenced to move. The smooth sloped faces 13 and 14 of the lug 11 will permit the socket loop $31^a$ to slide toward the holder pin 15, and the spring actuated pluger 34 will yieldingly hold the coupling loop 22 upward until the small loop $31^a$ moves relatively down under the lug 11 and then upward under the pressure of spring 36 until it (loop $31^a$) is seated between the curved edge 12 of the lug 11 and the holder pin 15.

If at any time it is desired to push one vehicle for a short distance while it is coupled to the other, the side edges of the metal adjacent to the socket or recess 31 prevent the coupler yoke 22 from being forced laterally away from the holder pin 15; and the curved edge at 12 of the lug 11 furnishes an abutment for the end of the coupler yoke, and also provides a stop to prevent said end from being pushed downward, that is, the coupling device not only transmits power from one vehicle to the other under longitudinal tension but also transmits power when longitudinal pressure is being exerted through them.

When two vehicles are to be uncoupled the operator pushes the coupler loop 22 downward until the small loop part $31^a$ swings below the lower end of the coupler lug 15, and at about this time the free end of the curved lug 33 is turned above the foremost point $34^a$ of the plunger 34; and thereupon the spring and the upper inclined surface $34^c$ acting on the curved lug 33 tend to swing the coupler loop 22 downward to the vertical position shown in Fig. 8. It will be held there somewhat firmly while the vehicle is out of use, or is uncoupled, and yet held with sufficient yielding capacity to avoid breakage in case the coupler loop should, while in this pendent position, be struck by any object on the floor or ground.

The rod 19 which extends the length of the vehicle is for staying and bracing the male element of the coupler and the vehicle frame and passes through the cross bars 5 and 21 and through the vertical parts of the coupler castings 4 and 20.

What is claimed is:

1. The herein described coupler devices for joining two adjacent trackless trucks having rigidly attached end-plates normally arranged to act as bumpers when approaching each other on lines inclined at any of numerous angles, said coupler presenting a male element and a female element each secured to an end of the base part of a truck, the female element being an elongated laterally expanded loop-like device hinged at its base line to the underside of one of said plates and having a laterally expanded triangular open space terminating in an active apex at its forward extremity, said element being adapted to swing up to a horizontal position under the floor of the adjacent truck when the trucks are at either of numerous angles as aforesaid, and the male element being a lug carried by and extending downward from the center of the end-plate of the adjacent truck and adapted to enter the open triangular space at the base line of the loop element and on either of several vertical lines remote from each other passing through said passageway, said male element and female element being adapted to positively compel relative movement of the cars to bring the male element to the apex of the loop.

2. In a coupler mechanism for joining two adjacent trackless trucks, a plate adapted to be secured to the base part of a truck body and to serve as a bumper to receive blows on lines inclined to the longitudinal lines of the truck, in combination with an elongated laterally expanded loop-like coupler element hinged on the underside of said plate and adapted to swing upward to a stop which holds it in horizontal position and formed with a widely expanded triangular opening which tapers forwardly and terminates in an active apex, said coupler being arranged to receive a lug positioned in the central longitudinal plane of a second truck and extending downward from the bottom of said truck, the loop being adapted to have the sides of its wider part engage with said lug and positively cause relative lateral movement of the cars to bring the lug to said apex.

3. The combination of the cast plate 20 adapted to be secured to a truck and having the widely separated bearing eyes 27, the swinging coupler element having the converging side bars 29 with pivot eyes, the cross-bar 32 and the arcuate lug 33 all cast integrally together, the loop being mounted on the underside of the plate 20 and adapted to swing when idle downward to depend therefrom, the spring actuated plunger 34 adapted to move the loop upward to operative position and to positively hold it up and also to move the said loop downward and to positively hold it down, and the cast plate 4 adapted to be secured to the center, transversely, of the end part of an adjacent truck, the swinging element and the lug being related substantially as set forth to have the lug enter the loop at either of several points along the base of the loop or at the apex or at intermediate points and to have the side bars of the swinging element bring the apex part of the loop to engagement with the lug.

In testimony whereof, we affix our signatures.

JAMES H. COTTON.
WILLIAM L. BURNER.